(12) United States Patent
Huang et al.

(10) Patent No.: US 8,935,165 B2
(45) Date of Patent: Jan. 13, 2015

(54) METHOD FOR DISPLAYING WORDS AND PROCESSING DEVICE AND COMPUTER PROGRAM PRODUCT THEREOF

(75) Inventors: Yu-Chen Huang, Tao Yuan Shien (TW); Che-Kuang Lin, Tao Yuan Shien (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 383 days.

(21) Appl. No.: 13/617,222

(22) Filed: Sep. 14, 2012

(65) Prior Publication Data

US 2013/0325464 A1   Dec. 5, 2013

(30) Foreign Application Priority Data

Jun. 5, 2012  (TW) .............................. 101120062 A

(51) Int. Cl.
*G10L 15/26* (2006.01)
(52) U.S. Cl.
USPC ........................................................ 704/235

(58) Field of Classification Search
USPC .................................................. 704/231–257
See application file for complete search history.

(56) References Cited

U.S. PATENT DOCUMENTS

2012/0089396 A1*  4/2012  Patel et al. .................... 704/249

\* cited by examiner

*Primary Examiner* — Abul Azad
(74) *Attorney, Agent, or Firm* — McClure, Qualey & Rodack, LLP

(57) ABSTRACT

The disclosure provides a method for displaying words. In the method, a speech signal is received. A pitch contour and an energy contour of the speech signal are extracted. Speech recognition is performed on the speech signal to recognize a plurality of words corresponding to the speech signal and determine time alignment information of each of the plurality of words. At least one display parameter of each of the plurality of words is determined according to the pitch contour, the energy contour and the time alignment information of each of the plurality of words. Thus, the plurality of words is integrated into a sentence according to the at least one display parameter of each of the plurality of words. Then, the sentence is displayed on at least one display device.

20 Claims, 6 Drawing Sheets

METHOD FOR DISPLAYING WORDS AND PROCESSING DEVICE AND COMPUTER PROGRAM PRODUCT THEREOF

CROSS REFERENCE TO RELATED APPLICATIONS

This Application claims priority of Taiwan Patent Application No.101120062, filed on Jun. 5, 2012, the entirety of which is incorporated by reference herein.

BACKGROUND OF THE INVENTION

1. Field of the Invention

The invention relates to speech input technology, and more particularly to displaying words based on speech input technology.

2. Description of the Related Art

When communicating by voice or in person, using tone, volume, speed and emotions, may help a communicator to clearly express himself/herself to a communicatee. However, when sending short messages or e-mails and communicating via text through instant message communication programs such as Microsoft Windows Messenger, tone, volume, speed and emotions may not always be communicated clearly, thus, resulting in miscommunication.

BRIEF SUMMARY OF THE INVENTION

In view of the above, the invention provides a method for displaying words based on characteristics of inputted speech and detected facial expressions of a user, to conveniently express tone, volume, speed and emotion via text.

An embodiment of the invention provides a method for displaying words, comprising: receiving a speech signal; extracting a pitch contour of the speech signal; extracting an energy contour of the speech signal; performing speech recognition on the speech signal to recognize a plurality of words corresponding to the speech signal and determine time alignment information of each of the plurality of words; determining at least one display parameter of each of the plurality of words according to the pitch contour, the energy contour and the time alignment information of each of the plurality of words; integrating the plurality of words into a sentence according to the at least one display parameter of each of the plurality of words; and outputting the sentence to be displayed on at least one display device.

Another embodiment of the invention provides a processing device, comprising: a speech input unit, receiving a speech signal; a processor, comprising: a pitch extracting module, extracting a pitch contour of the speech signal; an energy calculating module, extracting an energy contour of the speech signal; a speech recognition engine, performing speech recognition on the speech signal to recognize a plurality of words corresponding to the speech signal and determine time alignment information of each of the plurality of words; and a text processing module, determining at least one display parameter of each of the plurality of words according to the pitch contour, the energy contour and the time alignment information of each of the plurality of words and integrating the plurality of words into a sentence according to the at least one display parameter of each of the plurality of words; and a text output unit, outputting the sentence to be displayed on at least one display device.

Still another embodiment of the invention provides a computer program product embodied in a non-transitory computer-readable storage medium, wherein the computer program product is loaded into and executed by an electronic device for performing a method for displaying words, the computer program product comprising: a first code for receiving a speech signal; a second code for extracting a pitch contour of the speech signal; a third code for extracting an energy contour of the speech signal; a fourth code for performing speech recognition on the speech signal to recognize a plurality of words corresponding to the speech signal and determine time alignment information of each of the plurality of words; a fifth code for determining at least one display parameter of each of the plurality of words according to the pitch contour, the energy contour and the time alignment information of each of the plurality of words; and a sixth code for integrating the plurality of words into a sentence according to the at least one display parameter of each of the plurality of words and outputting the sentence to be displayed on at least one display device.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
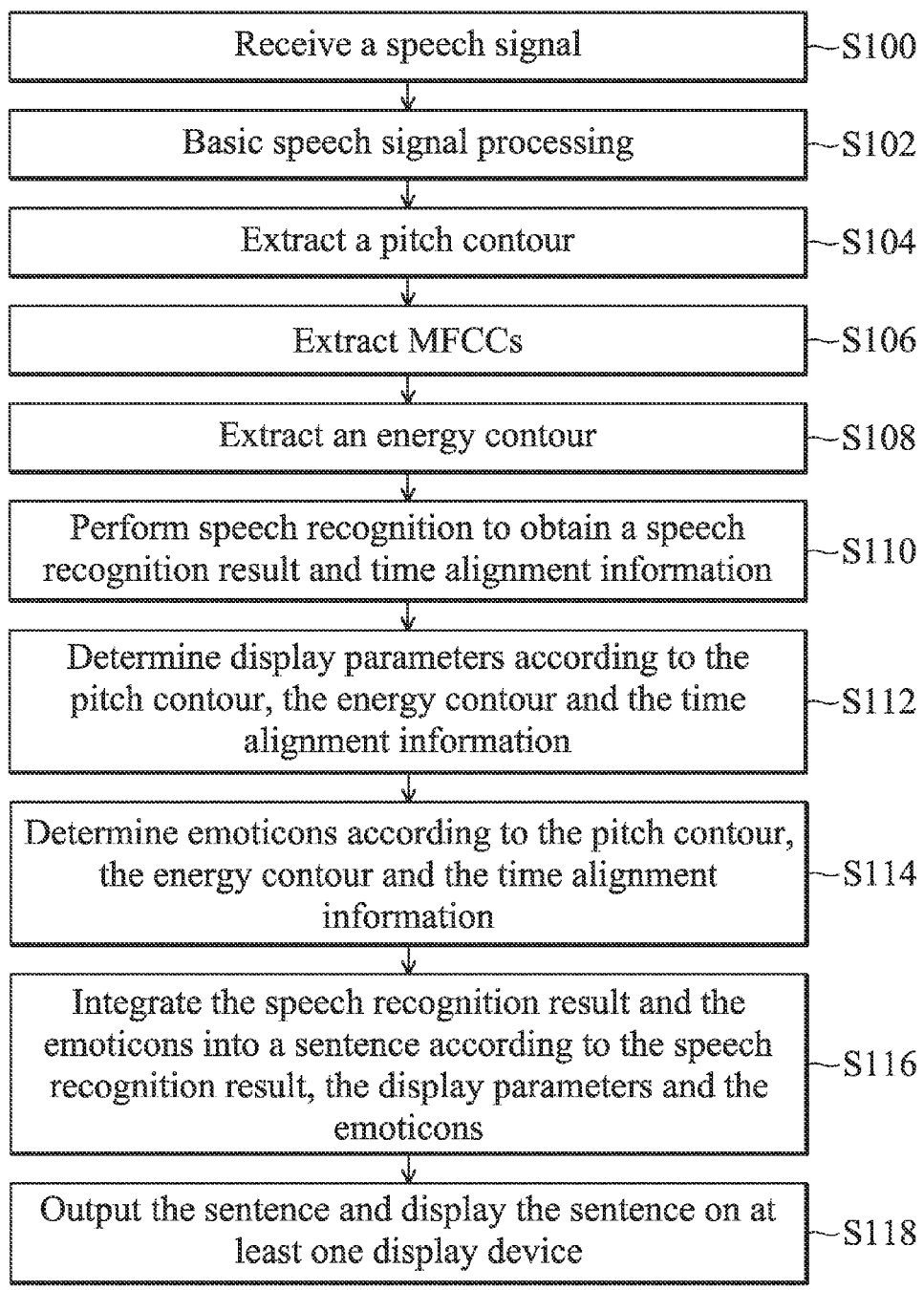
FIG. 1 illustrates a flow chart of a method for displaying words according to one embodiment of the invention.

FIG. 1 illustrates a flow chart of a method for displaying words according to one embodiment of the invention. In step S100, a speech signal is received. For example, a speech signal of a user is received through a microphone and recorded. In step S102, basic speech signal processing is performed on the speech signal, such as noise reduction of the speech signal, digitizing the speech signal, etc., for analysis and computation in following steps. Take FIG. 2 as an example, the speech signal 200 represents an acoustic waveform of the received speech signal after the received speech signal is digitalized. The transverse axis represents time, and the longitudinal axis represents amplitude.

Figure 2:
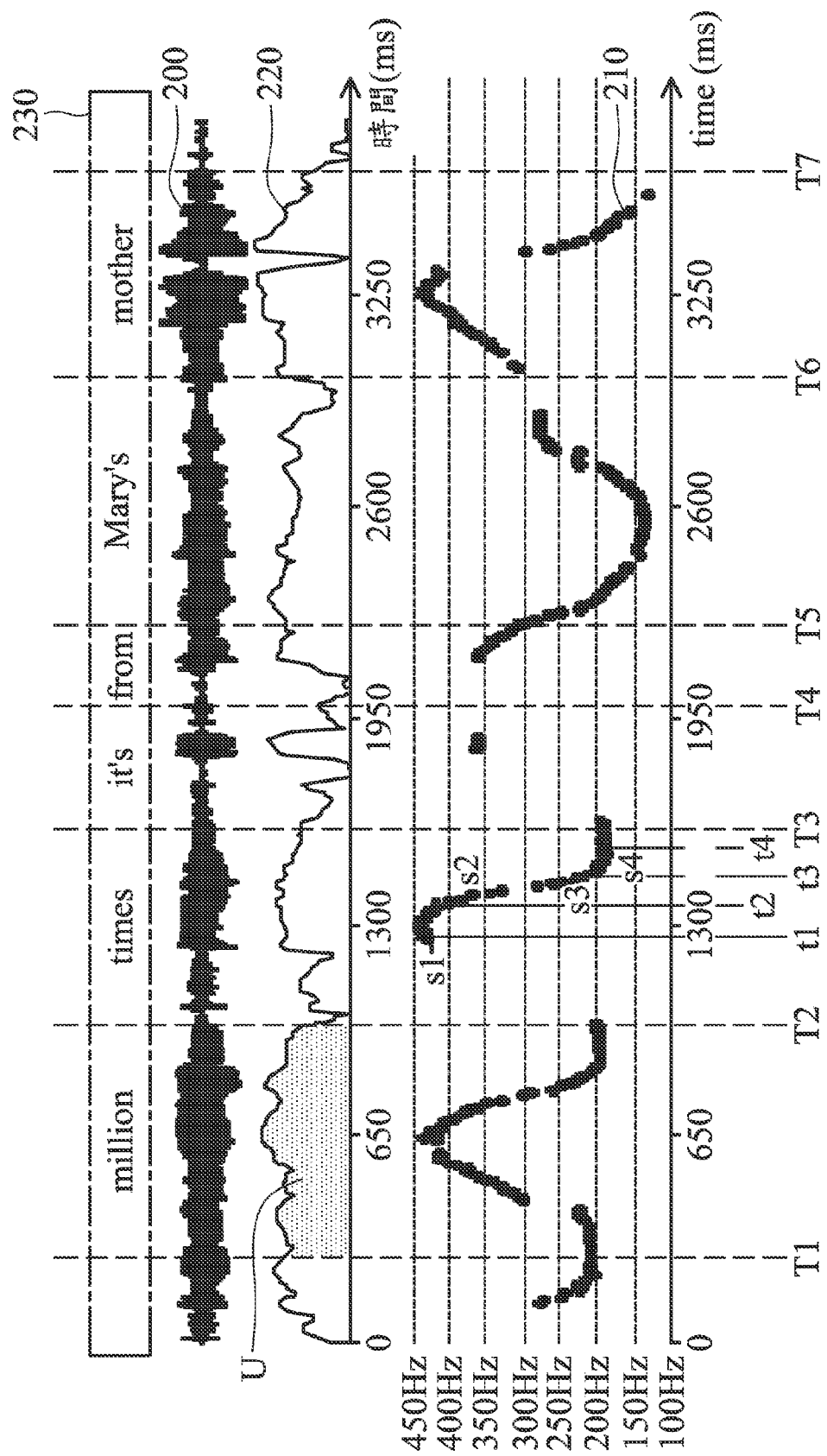
FIG. 2 illustrates a block diagram of speech signal processing according to the embodiment in FIG. 1.

In step S104, pitch tracking is performed on the speech signal 200 to extract a pitch contour of the speech signal, such as the pitch contour 210 shown in FIG. 2. The transverse axis of the pitch contour 210 represents time, and the longitudinal axis of the pitch contour 210 represents the frequency (Hz). The pitch contour 210 records fundamental frequencies, i.e., pitches, of the speech signal 200 with respect to time.

In step S106, Mel-scale Frequency Cepstral Coefficients (MFCCs) of the speech signal 200 are extracted. In this example, 39-dimentional MFCCs $C0 \sim C38$ of the speech signal 200 are extracted.

Then, in step S108, energy of the speech signal 200 is calculated according to the low-frequency MFCC C0 so as to obtain an energy contour of the speech signal 200, such as the energy contour 220 shown in FIG. 2. The MFCC C0 represents a function of the power of the speech signal 200. The transverse axis of the energy contour 220 represents time, and the longitudinal axis of the energy contour 220 represents energy. The energy contour 220 records energy corresponding to the volume of the speech signal 200 with respect to time.

In step S110, speech recognition is performed on the speech signal 200 according to the MFCCs C0~C38 so as to recognize words in the speech signal 200 and determine the time alignment information of each word. The speech recognition comprises identifying which segment of the speech signal 200 is noise, such as a segment of the speech signal 200 between 0 to T1.

The speech recognition further comprises performing pattern recognition according to the MFCCs C0~C38 of the speech signal 200 and reference models (such as acoustic models and language models) so as to obtain a speech recognition result. The speech recognition result may be a single word, a plurality of words or/and a sentence comprising a plurality of words, such as the speech recognition result 230 shown in FIG. 2. Take FIG. 2 as an example, after the speech recognition, the speech recognition result 230 of the speech signal 200 comprises the words of "million", "times". "it's", "from", "Mary's" and "mother". The speech recognition further comprises determining time alignment information of each word of the speech recognition result 230. That is, a starting time and an ending time of each word of the speech recognition result 230, what segment in the speech signal 200 each word corresponds to, and the length of time for each word. Take FIG. 2 as an example, the time alignment information comprises time points T2, T3, T4, T5, T6 and T7, which are ending times of "million", "times". "it's", "from", "Mary's" and "mother", respectively. In the example in FIG. 2, a starting time of a word is an ending time of another word which is one word before the word. For example, the ending time of "it's", which is one word before "from", is T4. Therefore, the starting time of "from" is T4, segments of the speech signal 200, the pitch contour 210 and the energy contour 220 between T4 and T5 correspond to "from", and the time difference between the T4 and T5 is the time of "from" in the speech signal 200. Note that the ending time of noise (i.e., T1) is the starting time of "million".

After steps S102 to S110, the pitch contour 210, the energy contour 220, the speech recognition result 230 and time alignment information of each word of the speech recognition result 230 are obtained. The time alignment information of each word comprises a starting time and an ending time of each word. Then, in step S112, display parameters of each word of the speech recognition result 230 are determined according to the pitch contour 210, the energy contour 220 and the time alignment information of each word of the speech recognition result 230. Display parameters at least comprise a position parameter, a size parameter and a distance parameter. The position parameter represents a vertical position of each word when displayed. The size parameter represents a displayed size of each word. The distance parameter represents a distance between a word and another word previous to the word. Display parameters may further comprise a color parameter, a typeface parameter and other parameters related to displaying words.

In step S114, emoticons are determined according to the pitch contour 210, the energy contour 220 and the time alignment information of each word of the speech recognition result 230. In one example, emoticons also belong to display parameters.

In step S116, each word of the speech recognition result 230 and the emoticons are integrated into a sentence according to the pitch contour 210, the energy contour 220, display parameters of each word of the speech recognition result 230 and the emoticons determined in step S114. In step S118, the sentence is outputted and displayed on at least one display device.

For example, when a user A uses a speech input module to chat with other users by text, the user A inputs a speech signal through a microphone, the speech input module retrieves the speech signal, as shown in step S100, and the speech input module performs processing in steps S100 to S112 on the speech signal to obtain a speech recognition result and display parameters of each word of the speech recognition result. Then the speech input module integrates each word of the speech recognition result into a sentence according to the speech recognition result and the display parameters of each word of the speech recognition result. The speech input module outputs the sentence so as to be displayed on the screen of the user A and screens of other users chatting with the user A. In one embodiment, the speech input module may take the form of a program. The program may be loaded into and executed by a processor for practicing the steps in FIG. 1. In another embodiment, the speech input module may directly take the form of hardware, such as an application-specific integrated circuit, so as to speed up execution.

FIGS. 3a-3d illustrate examples of displayed words according to flow chart in FIG. 1. Determining display parameters of each word of a speech recognition result according to a pitch contour, an energy contour and time alignment information of each word of the speech recognition result is explained with reference to FIGS. 3a to 3c.

Figure 3A:
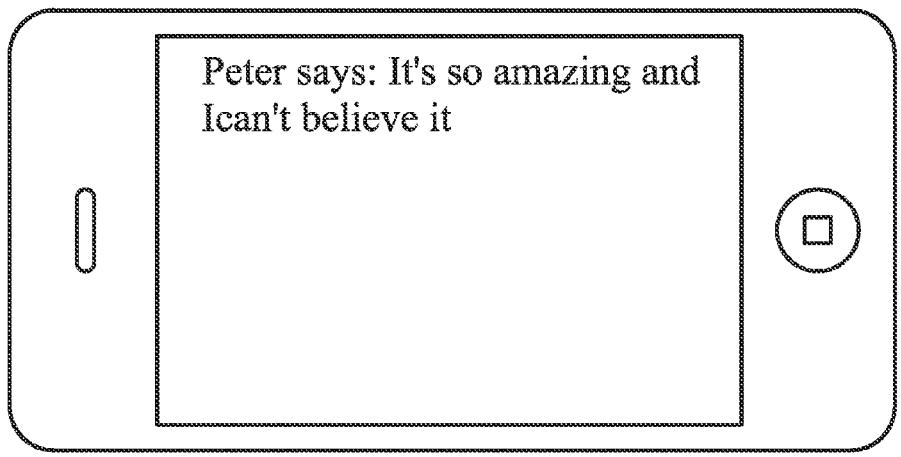
FIGS. 3a-3d illustrate examples of displayed words according to the embodiment in FIG. 1.

FIG. 3a illustrates an example of determining the distance parameter according to the time alignment information. In the example, a time difference between a starting time and an ending time of each word is used to determine the distance parameter. For example, since the time difference D1 between the ending time of "can't" and the ending time of "I" is smaller than the time difference D2 between the ending time of "I" and the ending time of "and", the distance between "can't" and "I" is smaller than the distance between "I" and "and". The distance parameter of a word may be set to be proportional to the time difference. Moreover, the distance parameter of a word may be set directly according to the starting time of the word. By determining the distance parameter according to the time alignment information, the invention may arrange distances among words according to occurred time of each word, so as to present the spoken rhythm of a speaker.

Figure 3B:
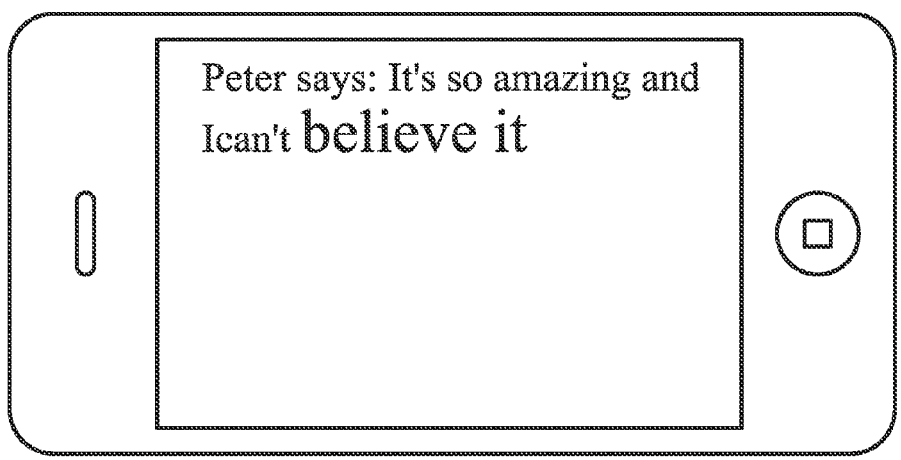

FIG. 3b illustrates an example of determining the size parameter according the energy contour. In the example, an average energy of each word is calculated first. A total energy of a word is equal to an area below the energy contour between the starting time and the ending time of the word. The average energy of the word is equal to the total energy divided by the time difference between the starting time and the ending time of the word. Take FIG. 2 as an example, the average energy of "million" is equal to U/(T2−T1), wherein U is the area as shown in FIG. 2. The size parameter of each word may be set to be proportional to the average energy of each word. When the average energy is larger, the size parameter is bigger, and thus the size of the word is bigger. In another example, a predetermined energy value is first set. If the average energy of a word exceeds the predetermined energy value, the size parameter of the word is set to be a first value. If the average energy of a word doesn't exceed the pre-determined energy, the size parameter of the word is set to be a second value. The first value is larger than the second value, and thus the word having the size parameter of the first value has a larger display size than the word having the size parameter of the second value. As shown in FIG. 3b, since the average energy of "believe" and the average energy of "it" are larger than the predetermined energy value, display sizes of "believe" and "it" are larger than that of other words. The invention is not limited to calculating the average energy of only one word at a time. The average energy of a plurality of words, a clause or a whole sentence may be calculated so as to determine the entire display size of the plurality of words, the clause or the whole sentence. For example, the average energy of a sentence is equal to the total energy of the sentence divided by the time length of the sentence and the total energy of the sentence is equal to the area below the energy contour of the sentence between the starting time and the ending time of the sentence.

Figure 3C:
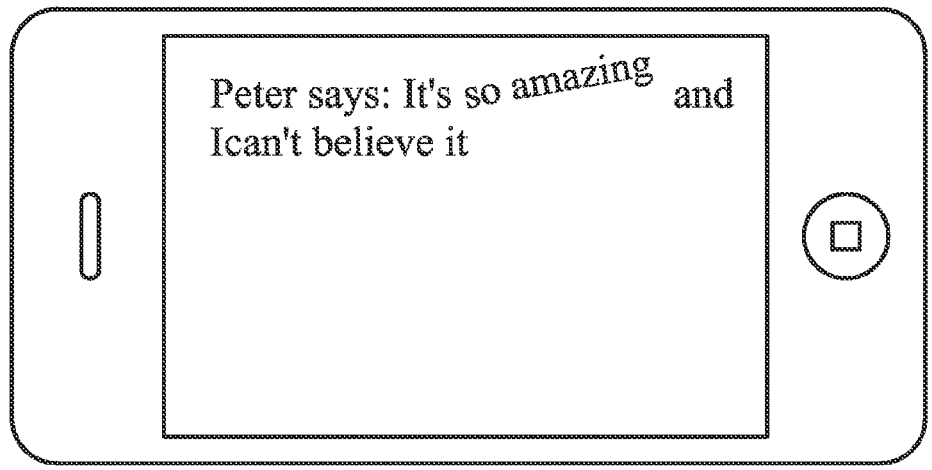

FIG. 3c illustrates an example of determining the position parameter according to the pitch contour. In the example, first, slope values of the pitch contour of a plurality of time points between the starting time and the ending time are calculated. Then, a linear regression is performed on the slope values, and a slope value of a regression line obtained from the linear regression is calculated. The position parameter of each word is determined according to the slope value of the regression line. The position parameter represents the vertical position of each word. In this example, the position parameter represents a display slope of each word.

Take FIG. 2 as an example. Regarding the word "time", slope values s1, s2, s3 and s4 of the pitch contour 230 respectively for time points t1, t2, t3 and t4 between the starting time T2 and the ending time T3 are obtained. Then regression analysis and curve fitting are used to perform simple linear regression on (t1, s1), (t2, s2), (t3, s3) and (t4, s4) to calculate the regression line and the slope of the regression line. Then, the position parameter of "times" is determined according to the slope of the regression line.

In one example, the display slope of each word may be directly set to be the slope of the regression line of each word. In another example, slopes of regression lines of all words are mapped into an interval, and one slope value is mapped to one value in the interval. Therefore, the position parameter of each word is set to be the value corresponding to the slope of the regression line, and the display slope of each word is the value.

The pitch trend of each word may be obtained from the slope of the regression line of each word. Therefore, determining the position parameter of each word according to the slope of the regression line of each word makes the displayed word represent the pitch trend of each word. Thus, a viewer may know that the pitch of each word is rising or falling when a speaker is speaking. That is, the pitch trend of each word is represented by the slope of the regression line of each word. The invention is not limited to calculating the slope of the regression line word by word. A slope of a regression line of a plurality of words may be calculated and the position parameter of the plurality of words may be determined according to the slope. For example, in FIG. 3c, slopes of the pitch contour for a plurality of time points in the time interval of "so amazing" are calculated first. A linear regression is performed on the slopes to obtain a regression line of the slopes. The slope of the regression line is assumed to be s5. Then, the position parameter of "so amazing" is determined according to the slope of the regression line so as to make the display slope of "so amazing" equal to s5 or a value corresponding to s5. As shown in FIG. 3c, the viewer may know that the pitch trend of "so amazing" is rising.

The number of time points is not limited to be 4 and can be adjusted according to requirements in practice. If a more precise requirement is desired for displaying the emotion of a speaker, the number of time points is increased. If processing time is limited, so as to display words more quickly, the number of time points is decreased.

Determining emoticons according to the pitch contour, the energy contour and the time alignment information of each word of the speech recognition result in step S114 is explained with reference to FIG. 3d.

Figure 3D:
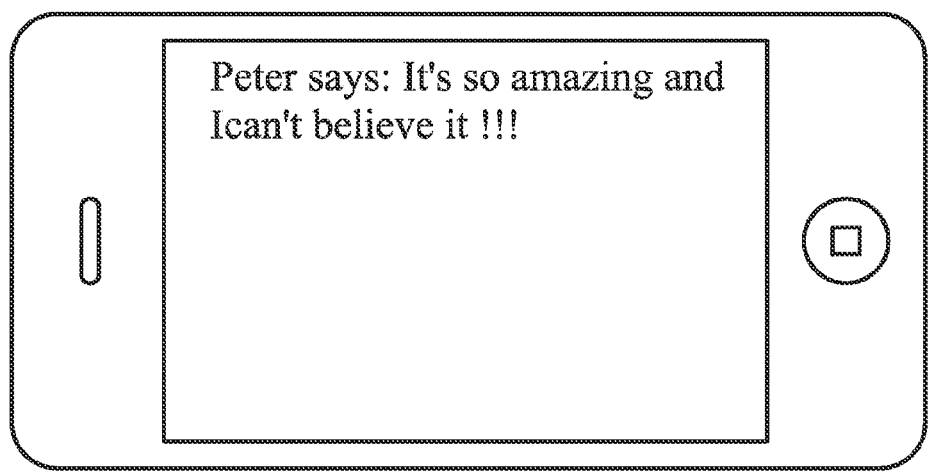

FIG. 3d illustrates an example of determining emoticons according to the pitch contour, the energy contour and the time alignment information. In the disclosure, emoticons comprise punctuation marks, such as an exclamation mark and a question mark, and conventional marks, such as a smiling face mark. When a speaker talks emotionally, the pitch contour and the energy contour of the speech signal of the speaker may have corresponding variations. Thus, whether emoticons are to be inserted is determined according to the average energy and the pitch trend of at least one word. If it is determined that emoticons are to be inserted, the type of emoticons is further determined according to the average energy and the pitch trend of each word. For example, if the average energy of one clause of the speech recognition result exceeds a predetermined energy value and the slope of the regression line of the clause is larger than a predetermined slope value, an emoticon is inserted into a position around the clause, such as at the back of the clause. For example, in FIG. 3d, the average energy of the clause " I can't believe it" exceeds the predetermined energy value and the slope of the regression line of the clause is larger than the predetermined slope value, and thus an emoticon "!!!" is inserted into a position at the back of "I can't believe it". In the invention, the type of emoticon that is to be inserted may be determined according to a combination of the average energy and the pitch trend. For example, if the average energy exceeds a first predetermined value and the slope of the regression line is larger than a second predetermined value, the corresponding emoticon is "!!!". If the average energy doesn't exceed a third predetermined value and the slope of the regression line is smaller than a fourth predetermined value, the corresponding emoticon is ". . . ".

Figure 4:
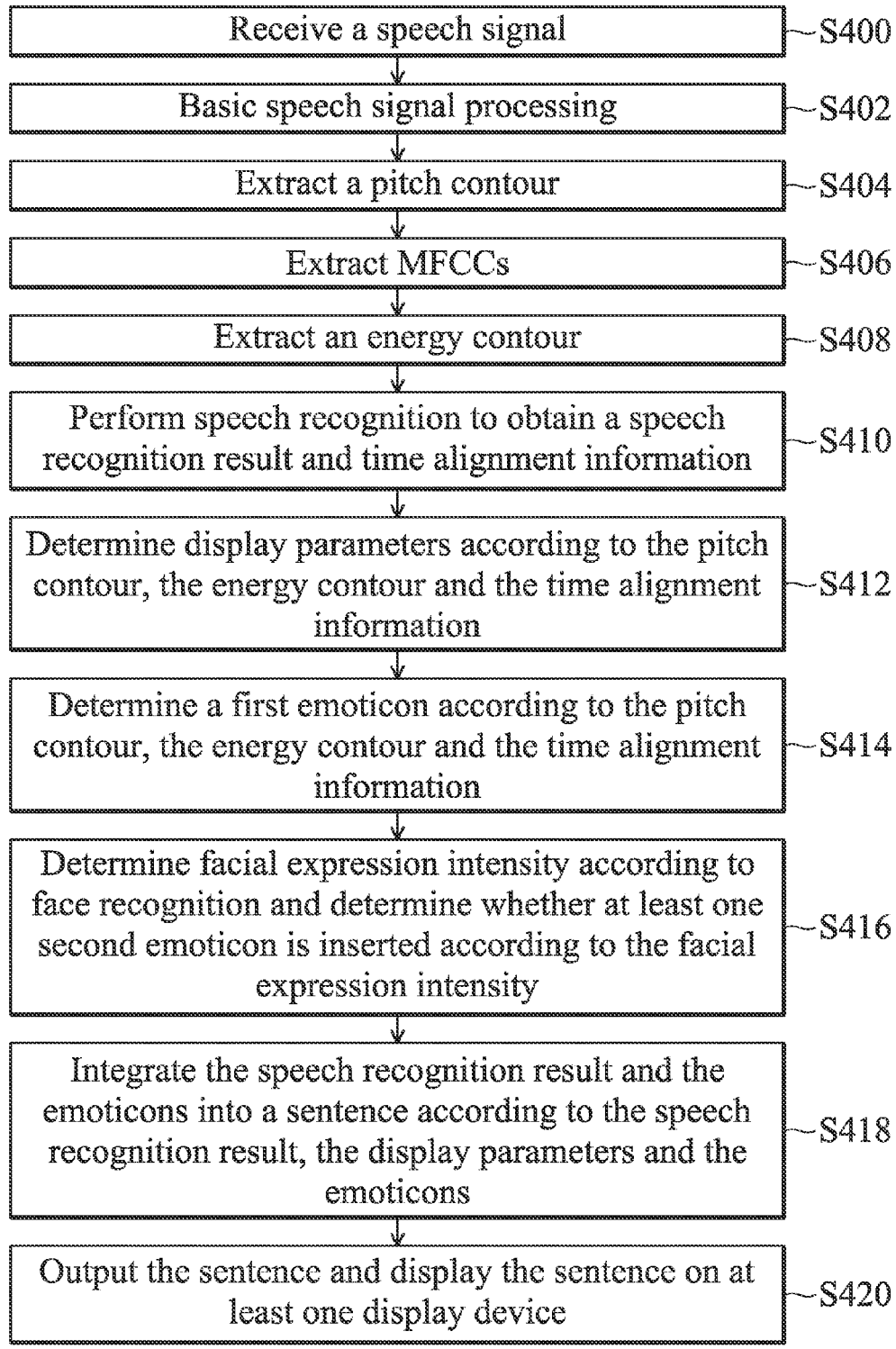
FIG. 4 illustrates a flow chart of a method for displaying words according to one embodiment of the invention.

FIG. 4 illustrates a flow chart of a method for displaying words according to one embodiment of the invention. Steps S400 to S412 are the same as steps S100 to S112 in FIG. 1, and thus, they will not be described again.

The difference between FIG. 4 and FIG. 1 is step S416. In addition to determining a first emoticon according to the pitch contour, the energy contour and the time alignment information of each word of the speech recognition result in step S414, a second emoticon is determined in step S416. In step S416, facial expression intensity is determined based on face recognition, and whether to insert at least one second emoticon is determined according to the facial expression intensity. For example, a video camera is used to capture images of the user when inputting the speech signal. Face recognition is performed on the images to extract facial images of the user when inputting the speech signal. Then facial features, such as canthus feature points and lip feature points, are extracted from the facial images. The facial expression intensity is determined according to facial features. After that, whether to insert at least one second emoticon into the clause is determined according to the facial expression intensity In an example of calculating smiling intensity, firstly, a face detector, such as a Viola-Jones type face detector or a SVM (Support Vector Machine)-based face detector, is used to perform face recognition so as to extract facial images and normalize the facial images for following calculations. Then facial features, such as LIH (Local Intensity Histogram), CS-LBP (Center-Symmetric Local Binary Pattern) and features related to LIH and CS-LBP, are extracted from the facial images. The smile intensity is calculated according to facial features. For example, LIH, CS-LBP or features related to LIH and CS-LBP are used to train SVMs for smile detection, and then a process of cascaded SVMs is used to calculate the smile intensity. If the smile intensity is larger than a predetermined value, a smile emoticon is inserted into the clause.

Then, in step S418, the speech recognition result and the emoticons determined in steps S414 and S416 are integrated into a sentence according to the speech recognition result, display parameters of each word of the speech recognition result and the emoticons determined in steps S414 and S416. In step S420, the sentence is outputted and displayed on at least one display device.

In one embodiment, steps S414 and S416 may be merged into single step. That is, emoticons are determined according to the pitch contour, the energy contour, the time alignment information of each word of the speech recognition result and the facial expression intensity. In another embodiment, the first emoticon is determined according to facial expression intensity in step S414 and the second emoticon is determined according to the pitch contour, the energy contour and the time alignment information of each word of the speech recognition result in step S416.

Figure 5:
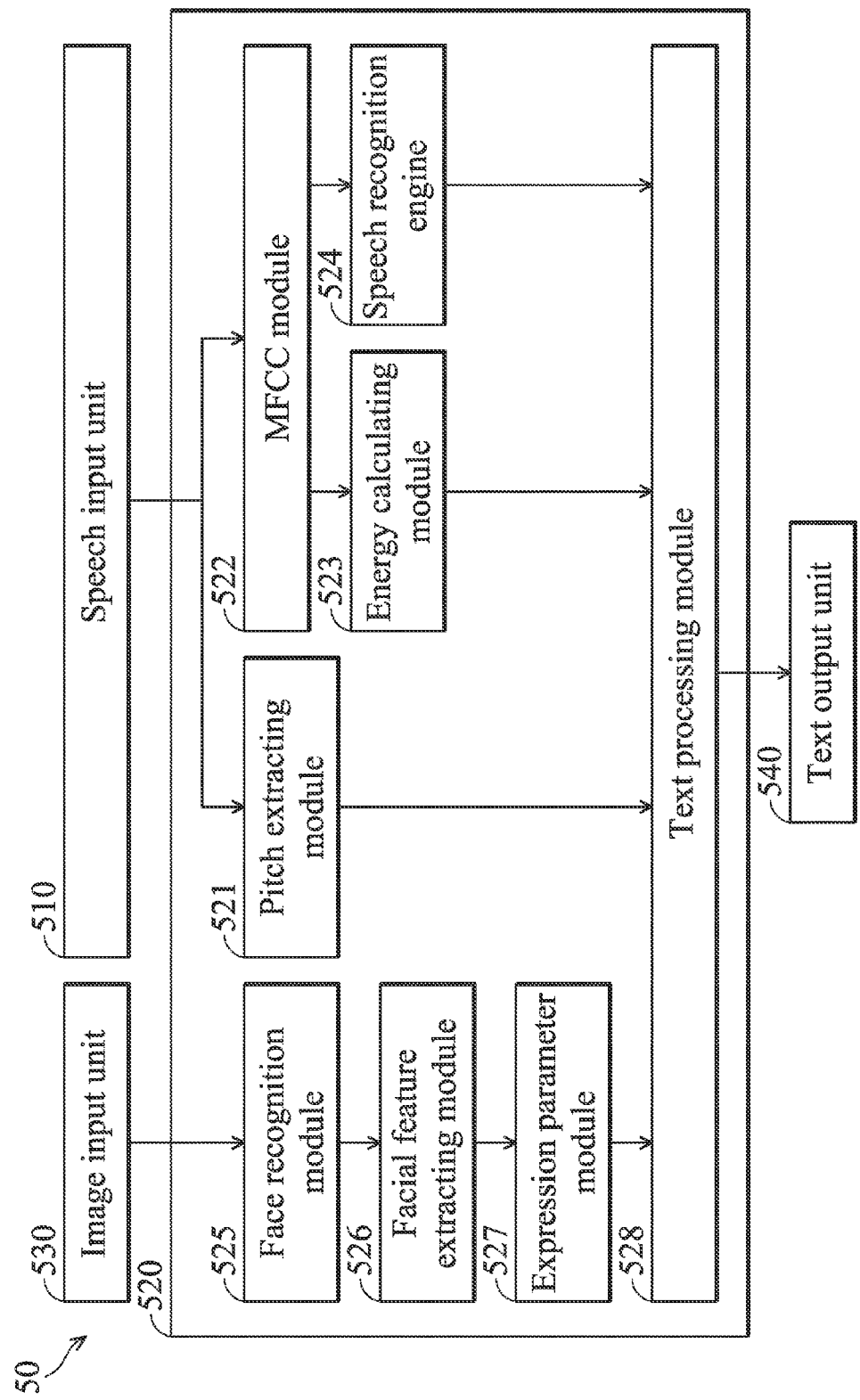
FIG. 5 illustrates a block diagram of a processing device according to one embodiment of the invention.

FIG. 5 illustrates a block diagram of a processing device 50 according to one embodiment of the invention. The processing device 50 comprises a speech input unit 510, a processor 520, an image input unit 530 and a text output unit 540. The speech input unit 510 receives a speech signal through a microphone. The image input unit 530 receives a video signal via a video camera. The processor 520, capable of processing audio and video signals, comprises a pitch extracting module 521, a MFCC module 522, an energy calculating module 523, a speech recognition engine 524, a face recognition module 525, a facial feature extracting module 526, an expression parameter module 527 and a text processing module 528. The pitch extracting module 521 extracts a pitch contour of the speech signal, such as the pitch contour 210 shown in FIG. 2. The MFCC module 522 extracts the MFCCs C0~C38 of the speech signal. The energy calculating module 523 extracts an energy contour of the speech signal, such as the energy contour 220 shown in FIG. 2. The speech recognition engine 524 performs speech recognition on the speech signal to recognize a plurality of words corresponding to the speech signal, such as the speech recognition result 230 shown in FIG. 2, and determines the time alignment information of each word, such as time points T1~T7 shown in FIG. 2. The face recognition module 525 performs face recognition on the video signal received by the image input unit 530 to retrieve facial images of the user when inputting the speech signal. The facial feature extracting module 526 extracts facial features, such as LIH, CS-LBP and features related to LIH and CS-LBP, from the facial images. The expression parameter module 527 determines facial expression intensity, such as smile intensity, according to facial features. The text processing module 528 determines a plurality of display parameters of each word according to the pitch contour, the energy contour and the time alignment. For example, a distance parameter of each word is determined according to a time difference between a starting time and an ending time of each word. A size parameter of each word is determined according to an average energy. A position parameter of each word is determined according to a slope of a regression line of a segment of the pitch contour corresponding to each word. The text processing module 528 also determines whether emoticons are to be inserted into the displayed content according to the average energy and the slope of the regression line, wherein types of inserted emoticons are determined according to the average energy and the slope of the regression line. The text processing module 528 further determines whether a corresponding emoticon is to be inserted into words according to facial expression intensity. Then the text processing module 528 integrates the speech recognition result and the emoticons into a sentence according to the speech recognition result, the plurality of display parameters of each word of the speech recognition result and the determined emoticons. The text output unit 540 outputs the sentence to be displayed on at least one display device.

Methods and systems of the present disclosure, or certain aspects or portions of embodiments thereof, may take the form of a program code (i.e., instructions) embodied in media, such as floppy diskettes, CD-ROMS, hard drives, firmware, or any other non-transitory machine-readable/computer-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

In one embodiment, the invention provides a computer program product embodied in a non-transitory computer-readable storage medium, wherein the computer program product is loaded into and executed by an electronic device for performing a method for displaying words, the computer program product comprising: a first code for receiving a speech signal; a second code for extracting a pitch contour of the speech signal; a third code for extracting an energy contour of the speech signal; a fourth code for performing speech recognition on the speech signal to recognize a plurality of words corresponding to the speech signal and determine time alignment information of each of the plurality of words; a fifth code for determining at least one display parameter of each of the plurality of words according to the pitch contour, the energy contour and the time alignment information of each of the plurality of words; and a sixth code for integrating the plurality of words into a sentence according to the at least one display parameter of each of the plurality of words and outputting the sentence to be displayed on at least one display device. The computer program product further comprises: a seventh code for capturing a facial image via a video camera; an eighth code for determining facial expression intensity according to the facial image; and a ninth code for determining whether to insert at least one first emoticon into the sentence according to the facial expression intensity.

While the invention has been described by way of example and in terms of preferred embodiment, it is to be understood that the invention is not limited thereto. To the contrary, it is intended to cover various modifications and similar arrangements (as would be apparent to those skilled in the art).

Therefore, the scope of the appended claims should be accorded the broadest interpretation so as to encompass all such modifications and similar arrangements.

What is claimed is:

1. A method for displaying words, comprising:
receiving a speech signal;
extracting a pitch contour of the speech signal;
extracting an energy contour of the speech signal;
performing speech recognition on the speech signal to recognize a plurality of words corresponding to the speech signal and determine time alignment information of each of the plurality of words;
determining at least one display parameter of each of the plurality of words according to the pitch contour, the energy contour and the time alignment information of each of the plurality of words;
integrating the plurality of words into a sentence according to the at least one display parameter of each of the plurality of words; and
outputting the sentence to be displayed on at least one display device.

2. The method as claimed in claim 1, wherein the at least one display parameter comprises a position parameter, a size parameter and a distance parameter.

3. The method as claimed in claim 2, further comprising:
capturing a facial image via a video camera;
determining facial expression intensity according to the facial image; and
determining whether to insert at least one first emoticon into the sentence according to the facial expression intensity.

4. The method as claimed in claim 3, further comprising:
calculating a plurality of Mel-scale frequency cepstral coefficients of the speech signal;
calculating energy of the speech signal according to the plurality of Mel-scale frequency cepstral coefficients to obtain the energy contour; and
performing the speech recognition on the speech signal according to the plurality of Mel-scale frequency cepstral coefficients to recognize the plurality of words and determine the time alignment information of each of the plurality of words.

5. The method as claimed in claim 4, wherein the time alignment information of each of the plurality of words comprises a starting time and an ending time in the speech signal of each of the plurality of words.

6. The method as claimed in claim 5, further comprising:
determining the distance parameter of each of the plurality of words according to a time difference between the starting time and the ending time of each of the plurality of words.

7. The method as claimed in claim 6, further comprising:
calculating an average energy of each of the plurality of words according to the energy contour between the starting time and the ending time of each of the plurality of words; and
determining the size parameter of each of the plurality of words according to the average energy of each of the plurality of words.

8. The method as claimed in claim 7, further comprising:
calculating a regression line of each of the plurality of words according to the pitch contour between the starting time and the ending time of each of the plurality of words; and
determining the position parameter of each of the plurality of words according to a slope of the regression line of each of the plurality of words.

9. The method as claimed in claim 8, further comprising:
determining whether to insert at least one second emoticon into a position in the sentence near at least one word the plurality of words according to the average energy of the at least one word and the slope of the regression line of the at least one word; and
if so, determining the at least one second emoticon according to the average energy of the at least one word and the slope of the regression line of the at least one word.

10. A processing device, comprising:
a speech input unit, receiving a speech signal;
a processor, comprising:
a pitch extracting module, extracting a pitch contour of the speech signal;
an energy calculating module, extracting an energy contour of the speech signal;
a speech recognition engine, performing speech recognition on the speech signal to recognize a plurality of words corresponding to the speech signal and determine time alignment information of each of the plurality of words; and
a text processing module, determining at least one display parameter of each of the plurality of words according to the pitch contour, the energy contour and the time alignment information of each of the plurality of words and integrating the plurality of words into a sentence according to the at least one display parameter of each of the plurality of words; and
a text output unit, outputting the sentence to be displayed on at least one display device.

11. The processing device as claimed in claim 10, wherein the at least one display parameter comprises a position parameter, a size parameter and a distance parameter.

12. The processing device as claimed in claim 11 further comprising:
an image input unit, capturing an image,
wherein the processor further comprises:
a face recognition module, performing face recognition on the image to retrieve a facial image;
a facial feature extracting module, extracting a facial feature of the facial image; and
an expression parameter module, determining facial expression intensity according to the facial feature, and
wherein the text processing module further determines whether to insert at least one first emoticon into the sentence according to the facial expression intensity.

13. The processing device as claimed in claim 12, wherein the processor further comprises:
a Mel-scale frequency cepstral coefficient (MFCC) module, calculating a plurality of Mel-scale frequency cepstral coefficients of the speech signal,
wherein the energy calculating module calculates energy of the speech signal according to the plurality of Mel-scale frequency cepstral coefficients to obtain the energy contour, and
wherein the speech recognition engine recognizes the plurality of words and determines the time alignment information of each of the plurality of words according to the plurality of Mel-scale frequency cepstral coefficients.

14. The processing device as claimed in claim 13, wherein the time alignment information of each of the plurality of words comprises a starting time and an ending time in the speech signal of each of the plurality of words.

15. The processing device as claimed in claim 14, wherein the text processing module determines the distance parameter of each of the plurality of words according to a time difference between the starting time and the ending time of each of the plurality of words.

16. The processing device as claimed in claim 15, wherein the text processing module calculates an average energy of each of the plurality of words according to the energy contour between the starting time and the ending time of each of the plurality of words and determines the size parameter of each of the plurality of words according to the average energy of each of the plurality of words.

17. The processing device as claimed in claim 16, wherein the text processing module calculates a regression line of each of the plurality of words according to the pitch contour between the starting time and the ending time of each of the plurality of words and determines the position parameter of each of the plurality of words according to a slope of the regression line of each of the plurality of words.

18. The processing device as claimed in claim 17, wherein the text processing module determines whether to insert at least one second emoticon into a position in the sentence near at least one word of the plurality of words according to the average energy of the at least one word and the slope of the regression line of the at least one word, and if so, the text processing module determines the at least one second emoticon according to the average energy of the at least one word and the slope of the regression line of the at least one word.

19. A computer program product embodied in a non-transitory computer-readable storage medium, wherein the computer program product is loaded into and executed by an electronic device for performing a method for displaying words, the computer program product comprising:
 a first code for receiving a speech signal;
 a second code for extracting a pitch contour of the speech signal;
 a third code for extracting an energy contour of the speech signal;
 a fourth code for performing speech recognition on the speech signal to recognize a plurality of words corresponding to the speech signal and determine time alignment information of each of the plurality of words;
 a fifth code for determining at least one display parameter of each of the plurality of words according to the pitch contour, the energy contour and the time alignment information of each of the plurality of words; and
 a sixth code for integrating the plurality of words into a sentence according to the at least one display parameter of each of the plurality of words and outputting the sentence to be displayed on at least one display device.

20. The computer program product as claimed in claim 19, further comprising:
 a seventh code for capturing a facial image via a video camera;
 an eighth code for determining facial expression intensity according to the facial image; and
 a ninth code for determining whether to insert at least one first emoticon into the sentence according to the facial expression intensity.

* * * * *